April 8, 1952  P. G. FRERER  2,592,410
AUTOMATIC BURNER CONTROL SYSTEM
Filed April 14, 1948  2 SHEETS—SHEET 1

Inventor
Paul G. Frerer.
By George V. Eltgroth
Attorney

April 8, 1952     P. G. FRERER     2,592,410
AUTOMATIC BURNER CONTROL SYSTEM Filed April 14, 1948     2 SHEETS—SHEET 2

Fig. 3

Inventor
Paul G. Frerer.
By George V. Eltgroth
Attorney

Patented Apr. 8, 1952

2,592,410

UNITED STATES PATENT OFFICE 2,592,410

AUTOMATIC BURNER CONTROL SYSTEM

Paul G. Frerer, Baltimore, Md., assignor to Bendix Aviation Corporation, Baltimore, Md., a corporation of Delaware Application April 14, 1948, Serial No. 20,941

8 Claims. (Cl. 158—28)

This invention relates to automatic control apparatus and, more particularly, to an improved automatic control apparatus adapted to direct the operation of heating installations.

A variety of problems, relating both to function and maintenance, are encountered in the design of apparatus for automatically controlling the operation of heating installations. The control unit must satisfactorily initiate the heating cycle, shutting the system down in the event that combustion does not occur. Thereafter, the operation of the system must be monitored and the heating unit must be disconnected from service in the event of combustion failure. The control unit must also guard against the establishment of possibly dangerous conditions in response to mishandling of the thermostat, or failure of parts within the control circuit. If combustion is not established at the beginning of the heating cycle, or should fail during the normal cycle, it is important that the system be taken off the line quickly. Usually, 90 seconds of operation are allowed at the beginning of the heating cycle for the establishment of combustion but, with respect to subsequent combustion failures, it is important that the apparatus be disconnected from service as quickly as possible. It is customary for heating installation control units to be arranged to respond to the heat developed by combustion in the furnace chamber.

Currently popular control units employ a slip-friction connection, with appropriate limiting stops, between the thermally sensitive driving unit and the switch governing the operation of the heating installation. The thermally responsive element conveniently takes the form of a helical bimetal immersed in the stack gases. As these gases are highly corrosive in nature, they tend to destroy the bimetallic driving unit within a relatively short time and may also attack the elements of the slip-friction driving unit, changing the coefficient of friction between the relatively movable parts or, indeed, preventing their relative movement altogether. Since the dimensions of the mechanical parts comprising a control unit of this type are fixed in the original design, it is not conveniently possible to vary the unit characteristics to meet the widely varying requirements found in different locations and furnaces. For example, the stack temperatures may vary in different installations from 300° F., to as high as 1000° F. In addition, these temperatures vary considerably over a period of time depending upon weather conditions, the degree of sooting of the heat exchanger, the tightness of the fire box, the direction of the wind, etc.

Accordingly, it is an object of the present invention to provide new and novel highly flexible control apparatus for use in connection with heating installations.

It is a further object of the invention to provide new and novel control apparatus whose range of adjustment is not restricted by mechanical limitations.

Yet another object of the invention is to provide a new and novel control system utilizing sensing elements relatively immune to the corrosion of ambient conditions.

Still another object of the invention is to provide new and novel burner control apparatus including provisions for varying the time during which an igniting stimulus is applied to the fuel.

Another object of the invention is to provide new and novel control apparatus which, in the event of combustion failure, will shut down the heating system and thereafter make a trial restart before disconnecting it permanently from service.

Another object of the invention is to provide a control unit which may be conveniently located at a distance from the combustion chamber and stack, and utilize sensing elements relatively immune to corrosive conditions encountered in the flue gases.

Still another object of the invention is to provide new and improved furnace control apparatus immediately removing the furnace from service in the event of mishandling of the thermostat.

Other objects and advantages of the invention will in part be obvious and in part be described when the following specification is read in conjunction with the drawings in which.

Figures 1, 2:
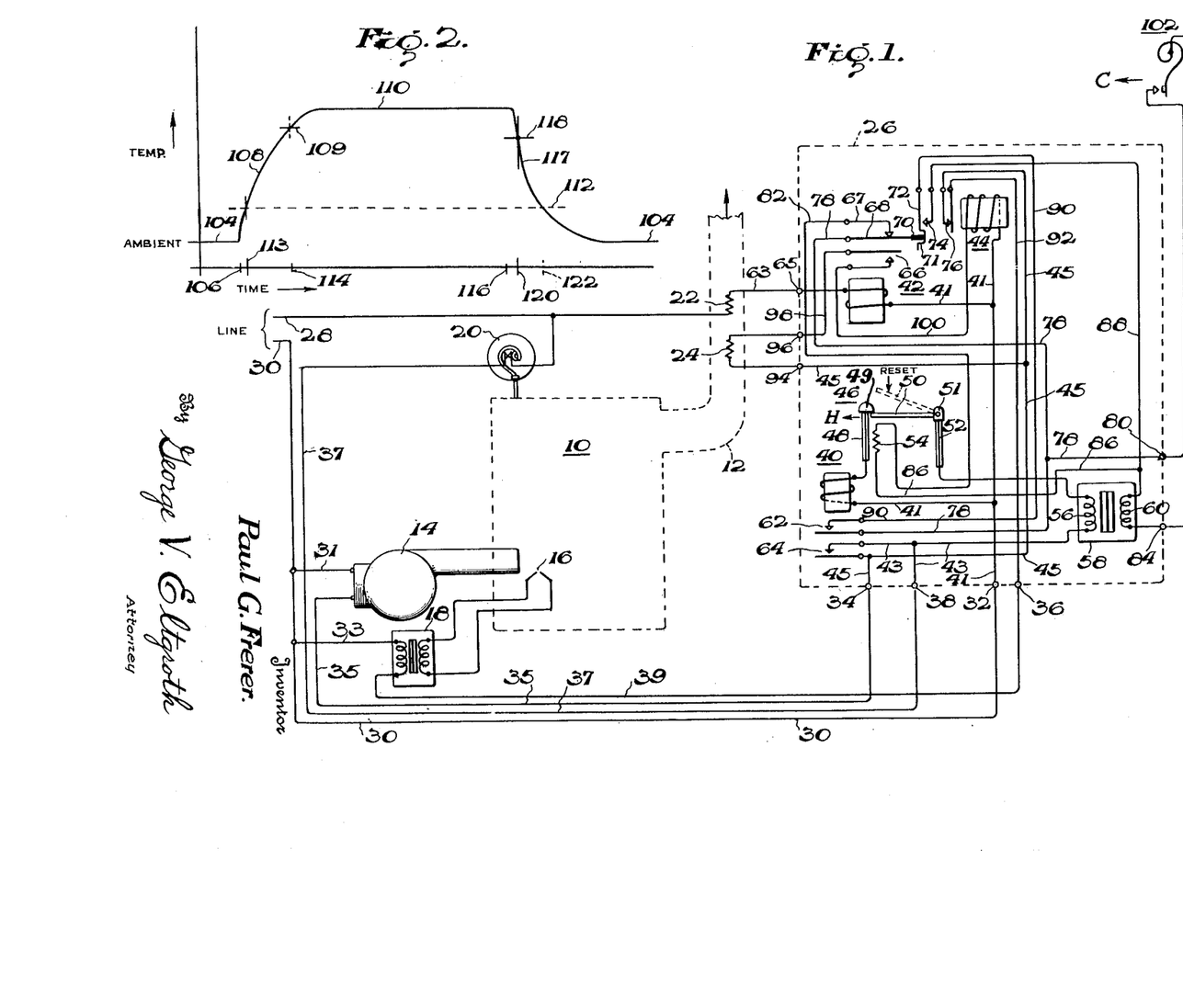
Fig. 1 illustrates schematically a burner control system incorporating the elements of the invention.
Fig. 2 illustrates graphically the relationship between temperature and time in the combustion chamber and associated flue passages.

Referring now to Fig. 1, there will be observed a furnace chamber 10 provided with the flue or stack passage 12. For the purpose of illustration, a gun-type oil burner 14 is shown, with the inner end of the blast tube projecting within the combustion chamber 10 adjacent a pair of spaced ignition electrodes 16 which are connected with the secondary of the ignition transformer 18. A normally closed limit switch 20 is associated with the combustion chamber 10. This limit switch may take the form of a temperature or pressure responsive switch and is intended to disconnect the heating installation from operation in the event and during the continuation of the occurrence of abnormal conditions. The burner 14 is connected to a fuel tank by the usual oil lines; not shown.

Conditions in the combustion chamber may be sensed by resistors 22, 24 which are of the thermally responsive type. While they are shown located in the flue passages, they may equally well be situated within the combustion chamber 10. These resistors are of a type well known in the art and may be be composed of 80% ferric oxide with the balance ball clay, bentonite and titanium dioxide or zirconium oxide. The exact composition is determined with respect to the intended operating temperature, the zirconium oxide composition being most suitable for use in the combustion chamber, while the titanium dioxide composition is more adapted to use in the flue passage.

The operation of the heating system is under the control of a unit 26, conventionally produced and marketed as a separate article of manufacture. The internal structure and functioning of the control unit 26 will later be described in complete detail.

It will be noted that the heating installation shown is adapted for electrical control. The system is powered by the connection of the mains leads 28 and 30 to the local power main. The power lead 30 is connected with the mains or line terminal 32 of the control unit 26 and, in addition, is connected to one side of the burner motor 14 by the lead 31 and to one side of the ignition transformer 18 by the lead 33. The power lead 28 may be connected with one end of the thermally responsive resistor 22, and is also connected with the line terminal 38 through the normally closed limit switch 20 and lead 37.

The other terminal of the burner motor 14 is connected with the burner terminal 34 by the lead 35, and one side of the primary of the ignition transformer 18 is connected with the ignition terminal 36 through the lead 39.

The control unit 26 is provided with three relays—a main relay 40, a start relay 42, and a run relay 44. These designations have been chosen since it is the relay 40 which directly controls the operation of the burner motor 14. On the other hand, the operation of the burner motor 14 cannot be initiated unless the start relay 42 is de-energized. After normal operating conditions have been established, the continued operation of the burner motor 14 is under the control of the run relay 44.

One end of the operating winding of the main relay 40 is connected to the line terminal 32 through the power bus 41. The other end of the operating winding of the relay 40 is connected with the active bimetal 48 of the safety switch 46. The safety switch 46 is of conventional construction and has a pair of spaced parallel bimetals including active bimetal 48 and compensating bimetal 52. A conductive latch bar 50 is pivoted to the compensating bimetal 52 at 51 and normally engages the latch tip 49 on the movable end of active bimetal 48. An electrical heater resistor 54 is thermally associated with the active bimetal 48. The latch 50 is conductive and is biased for clockwise rotation, being normally restrained therefrom by the latch tip 49. In response to the energization of the safety switch heater 54, the bimetal 48 assumes a divergent position, releasing the latch bar 50, which then snaps to the dashed-line position, opening the electrical circuit between the bimetals 48 and 52. The compensating bimetal 52 is connected with one end of the primary winding 56 of the transformer 58, whose other terminal is connected with the line terminal 38 through the power bus 43. The transformer 58 is of the step-down type, providing a relatively low voltage at the terminals of its secondary 60. While the system is illustrated with a transformer, it is to be remembered that this is employed only for convenience and assistance in meeting certain wiring regulations. This transformer serves only as an impedance and voltage level translating device and, in the following analysis, events occurring in the transformer secondary circuit may be regarded as present in the primary thereof. The omission of transformer 58 would not deviate from the principles of the invention.

A pair of normally open switches 62, 64 are operatively associated with the main relay 40 and adapted to close in response to the energization thereof. The switch 64 serves to control the operation of the burner motor 14 and is connected between line terminal 38 and burner terminal 34 by the leads 43 and 45, respectively.

The operating winding of the start relay 42 is connected at one end with the mains terminal 32 through the power bus 41 and, at its other end, with the thermally responsive resistor 22 via the lead 63 and terminal 65. The start relay 42 is provided with a normally open contact set 66 and a normally closed contact set 67, 68. The free end of the movable contact 68 is tipped with an insulating block 70 engaging a notch 71 in the movable contact arm 72 of the run relay 44. The contacts 66 close in response to the energization of the operating winding of the start relay 42, while the contacts 67, 68 tend to be separated. However, due to the action of the retaining notch 71, contacts 67, 68 do not separate until the movable contact arm 72 has been drawn toward its associated stationary contact 74 in response to the energization of the operating winding of the run relay 44. The movable contact 68 is connected with the thermostat terminal 80 through the lead 78, this lead also being connected to one of the contacts 62 on the main relay 40. The second thermostat terminal 84 is connected with one side of the secondary 60 of the transformer 58. A lead 86 extends from the second terminal of the secondary 60 to one end of the safety switch heater 54, whose other terminal is connected through the line 82 to the fixed contact 67 of the start relay 42.

A second lead 88 from this side of the secondary 60 of the transformer 58 is connected with the stationary contact 74 of the run relay 44. The associated movable contact 72 is linked with the other of the contacts 62 of the main relay 40 through the interconnecting lead 90. The normally closed contacts 76 of the run relay 44 are connected between the burner terminal 34 and the ignition terminal 36 by the burner bus 45 and ignition bus 92. In addition, the burner bus 45 is connected with the sensing impedance terminal 94, while the associated sensing impedance terminal 96 is linked with one of the contacts 66 of the start relay 42. The other contact 66 connects with one end of the operating winding of the run relay 44 via the lead 100. The other end of the operating winding of the run relay 44 is connected with the mains terminal 32 through the power bus 41. The temperature responsive resistor 24, earlier described, is connected between the sensing impedance terminals 94 and 96.

A thermostat 102 is located in the space whose temperature is to be controlled, and connected with the thermostat terminals 80 and 84. The thermostat 102 is of the type closing upon a drop in temperature.

With the foregoing apparatus in mind, the operation of the system and the control unit may now be readily understood. All switches and contacts in the diagram of Fig. 1 are shown for the thermostat satisfied condition in which the burner is shut down. In the shutdown or standby condition, it will be noted that a small current flows through the operating winding of the main relay 40 via the following circuit: mains terminal 32, lead 41, operating winding of relay 40, active bimetal 48, latch bar 50, compensating bimetal 52, primary 56, lead 43 and mains terminal 38. Due to the fact, however, that the circuit of the secondary 60 is open at the thermostat 102, this current is very small since it consists only of the excitation current for the transformer primary 56. Because this current is relatively small, the switches associated with the main relay 40 are not actuated. As the space temperature gradually drops, a point will be reached where the circuit between terminals 80 and 84 is completed by the thermostat 102. The secondary 60 then operates in the following closed circuit: thermostat terminal 84, thermostat 102, thermostat terminal 80, lead 78, contacts 67, 68, lead 82, safety switch heater 54 and lead 86 to the other side of said secondary 60. In response to the closing of the secondary circuit, the current passing through the primary 56 is considerably increased, permitting an operating current to flow through the winding of the main relay 40, closing switches 62 and 64. The closing of the switch 64 applies power to the burner motor 14 through the following circuit: leads 30, 31, burner motor 14, lead 35, burner terminal 34, lead 45, switch 64, lead 43, line terminal 38, lead 37, limit switch 20 and mains lead 28. At the same time, voltage is applied to the ignition transformer 18 to develop a high potential jumping the spark gap 16 to ignite the fuel spray delivered at the inner end of the blast tube of the burner 14. The circuit through which the ignition current flows is as follows: mains lead 30, lead 33, the primary of ignition transformer 18, lead 39, ignition terminal 36, lead 92, contacts 76, burner bus 45, contacts 64, and power bus 43 to the line terminal 38.

The problems involved in the control of an automatically fired heating installation will best be comprehended with reference to Fig. 2 illustrating the variation of temperature with time to be encountered in the combustion chamber or in the associated flue passages. The shape of this characteristic is essentially the same for either location, only the ordinates being subject to variation. However, in the following explanatory discussion, only the temperature ranges involved with flue-mounted sensing elements will be considered. Prior to the beginning of the operating cycle, the temperature encountered in the stack is constant at the level indicated by the curve portion 104. It is assumed that the operation of the burner is begun at the time 106 and immediately thereafter, assuming combustion has been established, the temperature rises along the curve 108 until it reaches its final value 110 remaining essentially constant thereafter. During the beginning of burner operation, although start relay 42 is energized at the temperature level 112, starting control is retained until the temperature level 109 on the rising curve 108 is reached at a time corresponding to the point 114 on the time axis, when the run relay 44 is energized to disable the time switch 46 which would otherwise shut down the burner. The curve of Fig. 2 further illustrates the temperature changes to be observed when the burner operation is interrupted at a time corresponding to the point 116 on the time axis. The temperature then drops along the line 117 until the sensing elements have again reached the ambient temperature level 104. When the temperature level 118 is reached on the downwardly sloping curve 117, the burner is locked out of operation until the temperature has further descended to or below the temperature 112. In a typical installation, the temperatures corresponding to the levels 112 and 118 may be 250° F., and 500° F., respectively, although these values are subject to variation in individual installations, depending upon the particular circumstances. The temperature levels 109 and 118 are displaced an amount controlled by the difference in pick-up and drop-out currents of run relay 44. It is important that the resumption of burner operation be prevented so long as the combustion chamber lies at a temperature level corresponding to the intermediate region between the two values 112 and 118. During the existence of temperatures higher than this critical region, fuel oil delivered to the combustion chamber will be immediately vaporized and ignited, corresponding substantially to a trouble-free resumption of the normal type of operation. If oil is supplied to the combustion chamber while the temperature is within the critical range, the oil will be vaporized but not ignited. This can result in an accumulation of highly explosive vapors which may be ignited with disastrous results if a resumption of operation is permitted during this period. For this reason the control apparatus is designed to prevent a resumption of burner operation until the temperature has dropped below a level corresponding to 112. At these relatively low levels, no great quantity of oil will be vaporized, thereby preventing the accumulation of potentially explosive gases. Thus, after the termination of combustion, due perhaps to water or air in the fuel lines, or manual manipulation of the thermostat, the burner is locked out of service within a time period corresponding to the separation between the point 116 and 120 on the time axis. Operation can not be resumed until the further passage of time corresponding to the distance to the point 122 on the time axis.

Bearing this information in mind, we may return to a consideration of the system of Fig. 1. The gradually increasing temperature of the flue gases raises the temperature of the thermally responsive resistor 22 until it passes sufficient current to operate the contacts associated with the start relay 42. This closes the contacts 66 completing the following energizing circuit for the operating winding of the run relay 44: line terminal 38, lead 43, switch 64, lead 45, sensing impedance terminal 94, thermally responsive resistor 24, terminal 96, switch 66, lead 100, relay 44, lead 41 and line terminal 32.

The relay 44 will not be energized at the instant of closure of the switch 66, however, since the resistance 24 and the winding of the relay 44 are proportioned to pass an operating current only at some higher temperature corresponding to the level 109 or 500° F., on Fig. 2. Since the relay 44 is not operatively energized, the notch 71 on the movable contact arm 72 continues to restrain any movement of the movable contact 68 on the start relay 42. Therefore the circuit across the secondary 60 continues to be closed through the original starting circuit including safety switch heater 54.

When the main relay 40 was energized, the closing of its associated contacts 62 partially completed an alternative circuit across the secondary of transformer 60. With the continuing operation of the burner 14, the temperature of the resistor 24 rises until it passes sufficient current through the operating winding of the relay 44 to actuate its associated contacts. The switch 76 is thereby opened to interrupt the delivery of current to the ignition transformer 18. At the same time, the contact 72 swings in to engage the fixed contact 74, thus fully completing the following alternative circuit across the secondary of the transformer 60: thermostat terminal 84, thermostat 102, thermostat terminal 80, lead 78, switch 62, line 90, movable contact 72, fixed contact 74 and the line 88. The inward movement of the movable contact arm 72 releases the end 70 of the movable contact arm 68 of the start relay 42 whose separation from contact 67 opens the original starting circuit across the secondary 60 of the transformer 58. The spacing and dimensions of the movable arms 68 and 72 with the locking extension 70 and notch 71 are so proportioned that the arm 68 is not released until the contact 72 has engaged fixed contact 74. This is necessary to prevent interruption of burner operation due to the momentary drop-out of main relay 40 which would otherwise result in the interruption of its energizing circuit. It should be noted that the newly established energizing circuit for the main relay 40 does not include the heater 54 of the safety switch 46, thus permitting the continued operation of the burner for an indefinite period.

The burner then continues operation until the temperature of the space in which the thermostat 102 is situated has reached a level opening the circuit through thermostat 102, thereby opening the circuit across the secondary 60 of the transformer 58. The increased impedance of the primary winding 56 then reduces the current flowing through the main relay 40 below the level required for actuation of the contacts 62, 64 which drop out of engagement and interrupt the flow of power to the burner motor 14. The stack temperature does not drop at once, and the resistors 22 and 24 remain at a sufficiently elevated temperature immediately after the interruption of burner operation to maintain both start relay 42 and run relay 44 in the energized position. Nevertheless, if the thermostat be immediately manually readjusted to a higher temperature, thereby reclosing the contact, the burner can not be restarted, since the starting circuit across the secondary 60 of the transformer 58 is interrupted by the opening of the switch 67, 68 which will not close until the resistor 22 has dropped to the relatively low temperature of 250° F. The running circuit across the secondary 60, normally closed through the switches 62 and 72, 74, is opened by the separation of the contacts 62 on the main relay 40. Hence, there can be no further operation of the burner until the resistor 22 has cooled sufficiently to permit the reengagement of contacts 67, 68 which occurs at a sufficiently low temperature level, as has been previously noted in connection with Fig. 2, to prevent the development of accumulations of possibly explosive vapors in the combustion chamber.

If the circuit through thermostat 102 remains closed, the burner will remain inoperative, as just noted, until the resistor 22 has cooled sufficiently. The resulting de-energization of start relay 42 permits contacts 67, 68 to close and complete the starting circuit across the secondary 60 of transformer 58, thereby energizing the main relay 40 and restarting the burner.

If the burner is not satisfactorily ignited at the beginning of the heating cycle, it is disconnected from service in response to the following action occurring in connection with the control unit 26. Since no flame appears in the combustion chamber 10, the thermally responsive resistors 22 and 24 remain cold. In considering this train of events, only the behavior of resistor 22 need be considered, since the resistor 24 is disconnected from the circuit by the existence of an open circuit at the switch 66 associated with the start relay 42. As before, burner operation has been initiated by the closing of the thermostat 102 establishing the previously noted starting circuit across the secondary 60 of the transformer 58: thermostat terminal 84, thermostat 102, thermostat terminal 80, lead 78, normally closed switch 67, 68, lead 82, safety switch heater 54 and lead 86. Since the resistor 22 remains cold, it will not pass sufficient current to operate the start relay 42, and contacts 67, 68 remain in engagement permitting the continued flow of electric current through the safety switch heater 54. The heat generated by the resistor 54 is transmitted to the associated active bimetal 48 which slowly moves to the left in a direction tending to disengage the latch bar 50. The thermal loss from the bimetal 48, the thermal conductivity between the bimetal 48 and safety switch heater 54, and the amount of heat developed in the safety switch heater 54, are so adjusted that after a suitable period of time, usually of the order of 90 seconds, this outward movement of the active bimetal 48 disengages the latch tip 49 from the latch bar 50. As previously noted, the latch bar 50 is biased for clockwise rotation and upon being released by the latch tip 49 snaps up to the dashed line position interrupting the circuit through the safety switch 46 until reset by the operator or supervisor of the heating installation. It may here be noted that the burner will be similarly disconnected from service in the event that, due to some irregularity in performance, the thermally responsive resistor 24 is not heated sufficiently to pass an operating current through the winding of the run relay 44, due to the interlocking action between the movable contact 72 of the run relay 44, and the movable contact 68 of the start relay 42. This interlock maintains contacts 67 and 68 in engagement until relay 44 operates, so that the heater 54 is not de-energized until the resistor 24 has reached the selected temperature indicated previously as of the order of 500° in the installation chosen for illustrative purposes.

Assuming that the burner has been successfully ignited and that the heating cycle has been functioning normally for some time, both relays 42 and 44 will be energized. Should combustion failure now occur, the train of events will be quite different. During the first few degrees of drop in the temperature of resistors 22 and 24.

caused by the combustion failure, all the elements of the system will continue to function as in the normal heating cycle. If combustion is not shortly re-established, however, resistor 24 first reaches a temperature causing the drop-out of the run relay 44 thereby opening the contacts 72, 74. These contacts are preferably adjusted to separate prior to the re-engagement of normally closed contact set 76 on the same relay. When contacts 72, 74 separate, the running circuit across the secondary 60 of the transformer 58 is opened. This circuit, it will be remembered, includes thermostat terminal 84, thermostat 102, thermostat terminal 80, lead 78, switch 62, lead 90, contact 72, contact 74 and lead 88. This causes the main relay 40 to drop out, opening switches 62 and 64. When the switch 64 is thus opened, the lead 45 is de-energized so that the reclosing of switch 76 no longer delivers power to the ignition terminal 36 through the lead 92. If this relative timing of the switch operation were not provided, it would be possible for a momentary electric discharge to appear across the electrode 16 and ignite any explosive vapors which might have collected in the combustion chamber 10.

The combustion failure sequence just described removes the burner from service by the opening of the switch 72, 74 on the run relay 44. Because the contacts 67, 68 remain open, due to the continued energization of the start relay 42, there is no energization of the safety switch heater 54 and, consequently, the burner 14 is not permanently removed from service due to the lock-out action of the safety switch 46. The temperature of the resistor 22 now continues to drop and eventually will reach a point where the resistor 22 no longer passes sufficient current to maintain the start relay 42 in an energized condition. This releases the movable contact 68 which returns to engagement with fixed contact 67, again completing the following starting circuit across the secondary 60 of the transformer 58: thermostat terminal 84, thermostat 102, thermostat terminal 80, lead 78, contact 68, contact 67, lead 82, safety switch heater 54 and lead 86 to the other terminal of secondary 60. When this starting circuit has thus been reclosed, the main relay 40 is again energized to reconnect the burner 14 and ignition transformer 18 with the power supply coming in on the mains leads 28 and 30. If, on this trial restart, the burner does not function properly, contacts 67, 68 will remain in engagement permitting the continued energization of the safety switch heater 54 with ultimate actuation of the safety switch 46 as previously outlined. This trial restart of the burner after a combustion failure is of considerable assistance in minimizing the number of lockouts requiring the attention of the operator. In many cases, the combustion failure, occurring while the burner is operating normally, is the result only of some temporary aberration or irregularity in performance or in the oil supply which will have passed by the time the trial restart is initiated.

If the safety switch heater 54 should burn out, the system will fail safe due to the fact that the starting circuit across the secondary 60 includes this resistor and can not be completed unless a closed circuit exists through the resistor 54. Should the resistor 54 open during the normal operation of the burner, the burner will continue to operate but at the end of the heating cycle, after the resistors 22 and 24 have cooled sufficiently, it can not be returned to operation due to the incomplete nature of the starting circuit jus described.

Should resistors 22, 24 become broken, or the leads thereto open, the contacts 67, 68 closing the starting circuit across the secondary 60 will remain in engagement permitting the continued energization of the safety switch heater 54 to again permanently remove the burner from service as earlier outlined. The method of interconnection of the control system with the mains leads 28 and 30 and the limit switch 20 is also of interest. It will be noted that all elements of the control unit, save the start relay 42 and its associated thermally responsive resistor 22, are energized under the supervision of the normally closed limit switch 20. On the other hand, the functioning of the start relay 42 is independent of the limit switch 20. The result of this method of connection is that while the limit switch 20 may initiate a burner shutdown in response to the existence of undesired conditions, the resumption of burner operation is completely under the control of the start relay 42 since it will be maintained in its energized position until the temperature of 22 has dropped to a relatively low value. This is a further guarantee against the possible accumulation of explosive fuel vapors in the combustion chamber 10 when the heating installation is functioning under limiting conditions.

Figure 3:
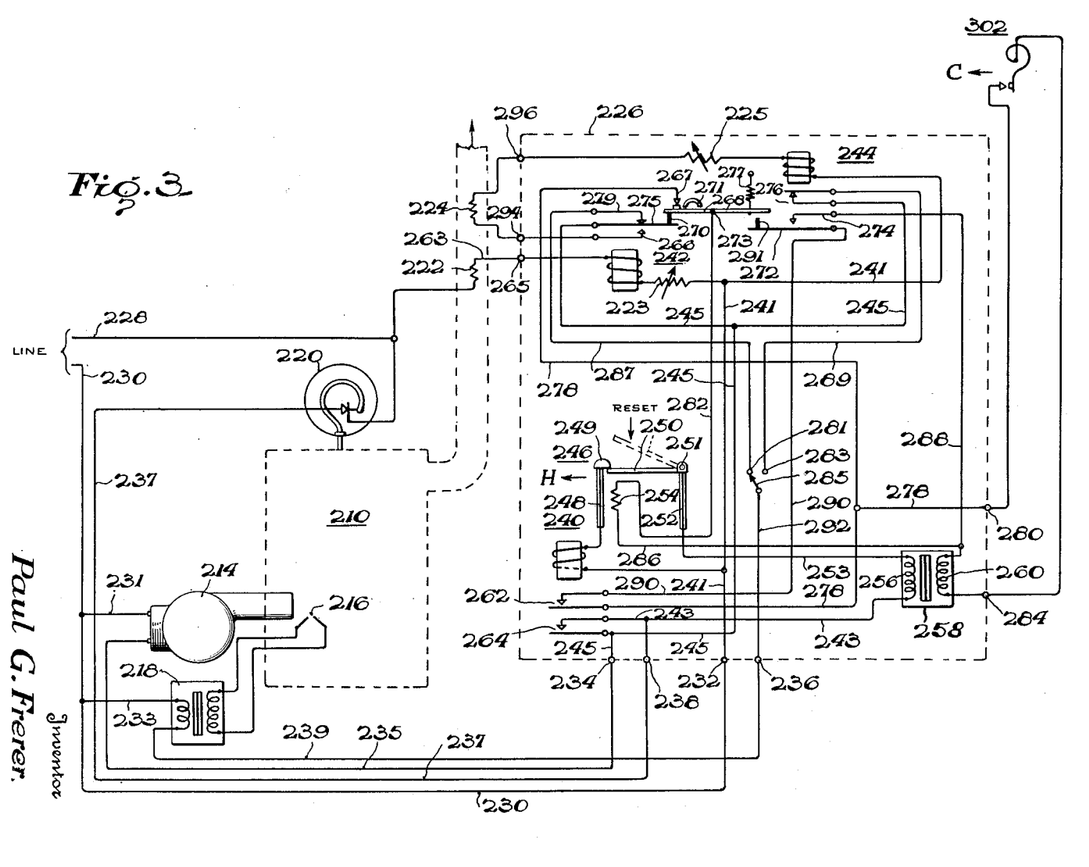
Fig. 3 illustrates schematically a control system embodying the essentials of the invention and having provisions for selecting different ignition periods.

Consideration of the burner control system of Fig. 3 reveals modifications providing for convenient control of the relative operating temperatures of the start and run relays making it readily adaptable to any installation which may be encountered and the presence of provisions for selecting the duration of the period during which an igniting impulse is applied to the fuel-air mixture delivered from the burner.

As before, the mains leads 228 and 230 are connected to a source of electric power to energize the heating installation. The control function is performed by a control unit 226 having a number of terminals adapted for connection with the various operating circuits. The heating system proper comprises a combustion chamber 210 connected with a flue or stack 212 within which are located the thermally responsive resistors 222 and 224 which may have a negative temperature coefficient as previously outlined in connection with Fig. 1. A gun-type burner 214 is mounted with the inner end of the blast tube projecting within the combustion chamber 210 adjacent a pair of spaced electrodes 216 connected with the high voltage secondary of the ignition transformer 218. As in the case of the previous figure, the fuel tank and oil lines associated with the burner 214 are omitted for the purposes of simplification, these details being well known in the art.

The mains lead 230 connects directly with the mains terminal 232 on the control unit 226. One terminal of the burner motor 214 is also connected with the mains lead 230 by the branch line 231 while one terminal of the ignition transformer 218 is similarly connected with the mains lead 230 by the branch line 233. The mains lead 228 is connected with one terminal of the resistor 222 and also with one of the contacts of the normally closed limit switch 220. The other contact of the limit switch 220 is linked with the mains terminal 238 of the control unit 226 through the line 237. This limit switch may be of the type adapted to interrupt the circuit therethrough in response to excessive temperature, pressure, or any other selected parameter of furnace operation.

The second terminal of the burner 214 is linked with the burner terminal 234 by the lead 235 while the second terminal of the ignition transformer 218 is connected with the ignition terminal 236 of the control unit 226 via the lead 239. Application of power to the burner 214 and the ignition transformer 218 by the energization of the corresponding control unit terminals causes the delivery of a fuel-air mixture adjacent the electrodes 216 between which a high voltage electric discharge plays, igniting this mixture. A main relay 240 having normally open contact sets 262 and 264 is mounted on the control unit 226. The normally open contacts 264 are connected between the mains terminal 238 and the burner terminal 234 by the leads 243 and 245. The operating winding of the main relay 240 is connected at one end with the mains terminal 232 by the lead 241 while its other end is connected to the active bimetal 248 of the safety switch 246 whose structure and operation are similar to the previous detailed description provided in connection with Fig. 1. A compensating bimetal 252 runs parallel to and spaced from the active bimetal 248 and has pivoted thereon at 251 a latch bar 250 biased for clockwise rotation but normally restrained from such movement by the projecting latch tip 249 mounted on the active bimetal 248. The bimetals 248 and 252 are selected and mounted to move in the same direction in response to similar changes in ambient temperature. However, the application of heat to the active bimetal 248 causes it to assume a divergent position moving the latch tip 249 to the left and releasing the latch bar 250 which thereupon moves quickly to the dashed-line position shown in Fig. 3. The compensating bimetal is in turn connected via the lead 253 with one of the leads from the primary 256 of the transformer 258, the other primary lead being connected with mains terminal 238 through the lead 243. As long as the safety switch 250 is in closed position the circuit connections just recited define an energizing circuit for the operating winding of the main relay 240 which, however, does not pass sufficient current to actuate the relay 240 so long as it is only traversed by the excitation current for the primary 256 of the transformer 258. However, in addition to the primary 256 the transformer 258 is provided with a secondary 260, and by closing a low impedance circuit across secondary 260 the impedance presented by the primary 256 is diminished sufficiently to permit an operating current to flow through the winding of the main relay 240.

These secondary circuits are under the control of the start relay 242 located in the control unit 226 and the run relay 244 also situated therein. Each of these relays controls contact assemblies situated in the circuit of the secondary 260 to control the operation of the main relay 240 in the desired manner. While the relays 242 and 244 directly control associated sets of contacts, the control unit 226 is provided with a beam 268 jointly responsive to the action of relays 242 and 244. The beam 268 is of paramagnetic material and is pivoted at 273, being biased for counterclockwise rotation by the resilient member 277 affixed thereto. At the left side of the pivot point 273 there is situated a permanent magnet 271 adapted to retain the beam 268 in engagement with the associated contact 267 against the action of the resilient member 277 after the left-hand end of the beam 268 has been pushed upward by the release and de-energization of the start relay 242. The contact 267 is connected with the thermostat terminal 280 through the lead 278, which also links the thermostat terminal 280 with one of the members of the contact set 262 of the main relay 240. The beam 268 is connected at its center point through the lead 282 with the safety switch heater 254 whose other terminal is connected through the lead 286 with one of the terminals of the transformer secondary 260. The other terminal of transformer secondary 260 is connected with the thermostat terminal 284. These thermostat terminals 280, 284 may be connected with a thermostat 302 situated in the space whose temperature is to be controlled. The thermostat 302, shown for purposes of illustration, is of the type presenting a closed circuit when the temperature falls below the level set by the user of the equipment.

The start relay 242 has an operating winding which is connected to the sensing impedance terminal 265 linked by the lead 263 with the thermally responsive resistor 222 having its other end connected with the mains lead 228. The second terminal of the operating winding of start relay 242 is connected with the mains terminal 232 through the lead 241 and the adjustable resistor 223. It is possible by adjusting the value of the resistor 223 to determine the temperature at which the thermally responsive resistor 222 will pass sufficient current to cause operation of the start relay 242. The start relay 242 is provided with a contact assembly including stationary contacts 266 and 279 between which the movable contact 275 is free to move in response to the energization and de-energization of operating winding 242. The movable contact element 275 is normally in engagement with the stationary back contact 279 and is provided with an insulating abutment 270 engageable with the left-hand end of the beam 268 upon de-energization of the start relay 242. Back contact 279 of the start relay 242 is connected with the fixed contact 281 of the ignition selector switch through the lead 287 while the movable contact 275 is connected with the mains terminal 238 through the lead 245, normally open main relay switch 264 and lead 243. The front contact 266 of relay 242 is connected with the sensing impedance terminal 294 which is in turn linked with the thermally responsive resistor 224 connected at its other end with sensing impedance terminal 296 and thence through adjustable resistor 225 to the operating winding of the run relay 244. The other end of the operating winding of the run relay 244 is connected with the mains terminal 232 through the lead 241. As in the case of start relay 242 the adjustable resistor 225 in circuit with the operating winding of the run relay 244 provides for adjustment of the temperature at which the thermally responsive resistor 224 will deliver an operating current to the run relay 244 when power is applied to this circuit. Run relay 244 is provided with a normally engaged contact pair 276 and a normally disengaged contact pair 274 which open and close, respectively, in response to the passage of sufficient current through the associated operating winding. One of the contacts 276 is connected with the lead 245 while the other of the contacts 276 is linked with the fixed contact 283 of the ignition selector switch by the lead 289. The normally disengaged contacts 274 are connected between one end of the transformer secondary 260 and one of the contacts 262 on the main relay 240 through the leads 288 and 290.

The ignition switch earlier referred to is provided with a movable contact arm 285 alternatively engageable with the stationary contacts 281 and 283. The movable arm 285 is in turn connected with the ignition terminal 236 through the lead 292. As will be later explained in additional detail, the placing of the movable arm 285 into either of its alternative positions serves to select the length of the ignition period.

The operation of the burner control system of Fig. 3 is essentially the same as that described in connection with Fig. 1. As long as the thermostat 302 is satisfied or at a sufficiently high temperature, it presents an open circuit thereby interrupting the circuit across the secondary 260 of the transformer 258 and preventing the energization of the main relay 240. When the temperature drops sufficiently, the thermostat contacts at 302 close, completing the following starting energizing circuit: thermostat terminal 234 which is connected with one of the leads from the secondary 260 of the transformer 258, thermostat 302, thermostat terminal 230, lead 278, contact 267, beam 268, lead 282, safety switch heater 254, and lead 286 to the opposite terminal of the secondary 260 of the transformer 258. The contacts 267 and 268 are in the engaged position since the start relay 242 has been deenergized permitting the movable arm 275 to assume its position in engagement with the back contact 279 whereupon the insulating block 270 displaces the beam 268 upwardly into a position adjacent the magnet 271 which thereafter retains the beam in this position until subsequent displacement in a manner to be described. The bridging circuit across the secondary 260 just described reduces the impedance presented by the primary 256 sufficiently to permit the passage of an operating current through the winding of the main relay 240 thereby closing contacts 262 and 264.

The closure of the contact set 264 of the main relay 240 applies power to the burner 214 through the following circuit: mains lead 230, connection 231, burner 214, line 235, burner terminal 234, lead 245, contacts 264, lead 243, mains terminal 238, lead 237, and the normally closed limit switch 220 to the mains lead 228. The simultaneous closure of the contact 262 is without effect at this time, but merely prepares a second running circuit for operation which can not be completed until the operation of run relay 244. At the same time power is applied to the primary of the ignition transformer 218 through the following circuit: mains lead 230, branch connection 233, thence through the primary of the ignition transformer 218, and the lead 239 to the ignition terminal 236. The further course of this current depends upon the setting of the ignition switch. If in the illustrated position the current passes through the lead 292, contact arm 285, contact 281, lead 287, back contact 279, movable contact 275, lead 245, contacts 264, through the lead 243, via mains terminal 238, and line 237 to the normally closed limit switch 220, and thence to the mains lead 228. The course of the ignition current just described is that taken when the ignition switch is placed in position for a short ignition period. The electric discharge between the electrodes 216 now ignites the fuel-air mixture delivered from the blast tube of the burner 214, and a flame is established in the combustion chamber 210, gradually raising its temperature and giving rise to the passage of heated gases through the flue or stack passage 212 past the thermally responsive resistors 222 and 224. The temperature of these resistors gradually increases, and the impedance which they present decreases. These resistors are again proportioned in conjunction with their associated relay operating windings to actuate the relays at different temperature levels, as described previously in connection with Figs. 1 and 2. Resistor 222 coacts with starting relay 242 to actuate this relay at a relatively low temperature which may be of the order of 300°. In this case, the energizing circuit for the operating winding of the start relay 242 includes the adjustable resistor 223, and it is therefore possible to adjust the operating temperature of this relay to meet the requirements of various installations and resistor locations by simply adjusting this part. When the temperature of resistor 222 has increased sufficiently, an energizing current for the operating winding of the start relay 242 flows through the following circuit: mains lead 228, resistor 222, connection 263, terminal 265, the operating winding of relay 242, adjustable resistor 223, line 41, mains terminal 232, and mains lead 230. This draws the movable contact member 275 out of engagement with the back contact 279 and into engagement with front contact 266. This operation of the start relay 242, however, does not affect the beam 268 and its cooperating contact 267 which are retained in engagement by the attraction of the magnet 271. Therefore, the safety switch heater 254 is not de-energized at this time. With the ignition switch in the position shown, the separation of contacts 275 and 279 interrupts the flow of current to the primary of the ignition transformer 218, shutting off the ignition discharge. Conversely, the engagement of movable contact 275 with front contact 266 completes the following exciting circuit for the operating winding of the run relay 244: mains lead 228, normally closed limit switch 220, line 237, mains terminal 238, lead 243, switch 264, lead 245, contact 275, contact 66, sensing impedance terminal 294, resistor 224, sensing impedance terminal 296, adjustable resistor 225, the operating winding of run relay 244, lead 241, and mains terminal 232 to the mains lead 230. At the time of closure, the current delivered through this circuit is not sufficient to operate the run relay 244, since the resistor 224 is conditioned to pass this operating current at a higher temperature than is required for the energization of the start relay 242 through resistor 222. As in the previous resistance control circuit, it is possible by adjustment of the resistor 225 to control the temperature at which the run relay 244 is energized to accommodate the requirement in individual installations.

At the higher temperature level selected, the actuation of the run relay 244 opens the normally closed contact 276 and closes the normally open contact 272, 274. At the same time that the movable contact arm 272 swings into engagement with the front contact 274, the insulating abutment 291 mounted on the end thereof engages the right-hand end of the beam 268 exerting a force overcoming the attraction of the detent magnet 271 to rotate the beam 268 about the pivot 273 thereby disengaging it from the fixed contact 267. This opens the circuit through the safety switch heater 254, but the main relay 240 is not de-energized because of the following alternative running circuit established across the secondary 260 of the transformer 258 by the closure of the switch 272, 274: secondary 260, thermostat terminal 284, thermostat 302, thermostat terminal 280, lead 278, switch 262, lead 290, contact 272, contact 274, and lead 288 to the other side of secondary 260. The simultaneous opening of the switch 276 disconnects the stationary contact 283 from the burner bus 245, but with the ignition switch in the illustrated position, this plays no part in the operation of the control unit 226. If, however, the movable arm 285 of the ignition switch is in engagement with the stationary contact 283, the ignition transformer 218 remains connected to the power supply until the opening of contact 276 at which time it is disconnected therefrom and the ignition discharge discontinued. Thus with the ignition switch in the left-hand position illustrated, the ignition discharge is discontinued early in the burner starting cycle, while with the arm 285 in the right-hand position engaging stationary contact 283 the ignition discharge is continued for a much longer period of time.

If combustion should cease early in the burner cycle during the period between the energization of start relay 242 and run relay 244, the safety switch heater 254 will continue to be energized and the burner permanently disconnected from service at the end of the starting period allowed.

Subsequent to the energization of both relay 242 and 244, which occurs as previously outlined, the burner will continue to function so long as there is no flame failure, no power line failure and the thermostat contacts at 302 remain in engagement. When the heated space has reached the desired temperature, the contacts at thermostat 302 separate and interrupt the circuit across the secondary 260, thereby increasing the impedance reflected into primary 256 sufficiently to operatively de-energize main relay 240 opening the switch 264 which interrupts the supply of power to the burner motor 214. The resistors 222 and 224 can not cool more rapidly than the combustion chamber whose temperature drops gradually. Therefore, the start relay 242 and run relay 244 remain energized for some time. If the householder now immediately resets the thermostat to a higher temperature, thereby closing its contact, the burner 214 will not start, since the starting circuit across the secondary 260 is open at the contact 267, for the beam 268 will not return to engagement with this contact until the start relay 242 has been de-energized to release the movable contact arm 275 whose associated insulating abutment 270 returns the beam 268 to the position where it engages contact 267. The running circuit across the secondary 260 is open at the contact set 262 on the main relay 240.

Should there be a power line failure, the control unit relays will return to standby condition and, upon the reapplication of power, the usual starting sequence will be established, the length of the ignition period depending upon the length of time during which the burner remained inoperative.

After the burner has been started and functioning normally for some period of time, the delivery of fuel may be interrupted by the presence of water or air in the oil supply line. The resulting failure of combustion permits resistsors 222 and 224 to cool. Run relay 244 will first be de-energized because of the higher temperature required for the passage of an operating current through its energizing circuit. When this occurs, the running circuit across the secondary 260 of the transformer 258 is interrupted by the separation of contacts 272 and 274. This diminishes the current flowing through the operating winding of main relay 240, permitting the contacts 262 and 264 to drop out of engagement, removing power from the burner motor 214. The main relay 240 remains de-energized until the drop in temperature in the combination chamber and flue passages has proceeded to the point causing de-energization of the start relay 242. This is because the beam 268 is out of engagement with the contact 267 and will not return to this position to complete the starting secondary circuit until the starting relay 242 has been de-energized by a sufficient fall in temperature of resistor 222. During this time, it will be noted, there has been no passage of current through the safety switch heater 254, and therefore the heating installation is not locked out of service. Upon the re-engagement of beam 268 and contact 267, in response to the de-energization of starting relay 242, the starting circuit through the safety switch heater 254 is re-established to make a trial start and determine whether the conditions leading to the shutdown were permanent, in which case the safety switch 246 will be actuated to permanently remove the burner from service until such time as the abnormal condition has been corrected and the latch bar 250 reset. This provision for a trial restart greatly reduces the number of burner shutdowns and service calls resulting therefrom.

The response of the control unit of Fig. 3 to the operation of the limit switch 220 is essentially identical with that of the control unit shown in Fig. 1. When the limit switch 220 opens, it immediately de-energizes the burner motor 214, main relay 240 and running relay 244, the latter two by the interruption of the power supply to the mains terminal 238. However, the circuit through the thermally responsive resistor 222, the operating winding of starting relay 242, and the adjustable resistor 223 remain undisturbed, permitting the continued flow of current through this circuit. Therefore, the starting relay 242 will be maintained in energized position until the temperature of the combustion chamber has dropped to the figure at which it is safe to restore the burner 14 to operation. This is because the starting circuit across the secondary 260 can not be closed at contact 267 and beam 268 until the beam 268 has been shifted upwardly by the release of the movable contact arm 275.

Many minor variations and modifications will be apparent to those skilled in the art, but which do not depart essentially from the principles of the invention. In the embodiment chosen for illustrative purposes, resistors having a high negative temperature coefficient have been described, but it is obvious that positive coefficient resistors could be employed with appropriate circuit modifications, although some method of separately monitoring the continuity of such resistors would be indicated. In addition, as has been earlier emphasized, the inclusion of the transformer 258 is a matter of design convenience and the transformer could be omitted without any appreciable change in the mode of operation.

What is claimed and desired to be secured by United States Letters Patent is:

1. A control apparatus for an electrically actuated ignition device and a burner, comprising a burner actuating circuit including a main relay; a normally open switch adapted to be closed by said relay in response to a call for heat from said burner, one side of said switch being connected to a power supply lead; a first normally closed switch; means for opening said first switch at a first temperature level of the products of combustion of said burner; a second normally closed switch; means for opening said second switch at a second temperature level of the products of combustion of said burner higher than said first level; circuit means including manually operable means for selectively connecting said first and second switches between the other side of said normally open switch and an ignition supply lead, and means for connecting said ignition device between said ignition supply lead and a power supply lead.

2. In burner control apparatus, a first control relay having a first normally open switch and a second normally closed switch operatively associated therewith, operating circuit connections for energizing said first relay when the products of combustion of said burner are at a first temperature level, a second control relay having a third normally open switch operatively associated therewith, operating circuit connections including in series said first switch for energizing said second relay when the products of combustion of said burner are at a second temperature level higher than said first temperature level, a burner starting circuit including said second switch, and a burner running circuit including said third switch.

3. In burner control apparatus, a first control relay having a first normally open switch and a second normally closed switch operatively associated therewith, operating circuit connections for energizing said first control relay when the products of combustion of said burner are at a first temperature level; a second control relay having a third normally open switch operatively associated therewith, operating circuit connections for said second control relay including said first switch for energizing said second relay when the products of combustion of said burner are at a second temperature level higher than said first temperature level; a burner starting circuit including said second switch; a burner running circuit including said third switch, and interlock means preventing the opening of said second switch until said third switch has been closed.

4. In a burner control apparatus; first, second, and third mains' leads; a normally closed limit switch connecting said second main's lead with said third main's lead; a first electric control relay having first and second switches governed thereby; means connecting said first control relay between said first and second main's leads, including a first thermally responsive resistor; a second electric control relay having a third switch governed thereby; means connecting said second control relay between said first and third main's leads including a second thermally responsive resistor and said first switch, said resistors adapted to be thermally associated with the products of combustion of said burner, said first resistor adapted to respond to a first temperature level of the products of combustion of said burner to permit energizing current to flow through said first relay, said second resistor adapted to respond to a second temperature level of the products of combustion of said burner higher than said first temperature level to permit energizing current to flow through said second relay; a burner starting circuit including said second switch connected between said first and third main's leads; and a burner running circuit including said third switch connected between said first and third main's leads, and interlock means preventing response of said second switch to the influence of said first control relay until after actuation of said second control relay.

5. The combination defined in claim 4, wherein said burner running circuit has in series therewith a fourth switch, and a third control relay is operatively linked with the burner starting and running circuits, said third relay governing said fourth switch.

6. In a burner control apparatus; a circuit including a main control relay and a first normally closed time-delay switch for supervising the operation of said burner; a first energizing circuit for said main relay including a second normally closed switch and electrically responsive means for opening said time-delay switch at a predetermined time interval after initiation of current flow through said means; a second energizing circuit for said main relay including a third normally open switch and a fourth normally open switch, said fourth switch closing in response to energization of said main relay; means for opening said second switch in response to a first temperature level of the products of combustion of said burner; means for closing said third switch in response to a second temperature level of the products of combustion of said burner higher than said first temperature level, and interlock means preventing the opening of said second switch until said third switch is closed.

7. In a burner control apparatus; first, second, and third mains' leads; a normally closed limit switch connecting said second main's lead with said third main's lead; a first electric control relay having a first normally open switch and a second normally closed switch governed thereby; means connecting said first control relay between said first and second main's leads, including a first thermally responsive resistor; a second electric control relay having a third normally open switch governed thereby; means connecting said second control relay between said first and third main's leads including a second thermally responsive resistor and said first switch, said resistors adapted to be thermally associated with the products of combustion of said burner, said first resistor adapted to respond to a first temperature level of the products of combustion of said burner to permit energizing current to flow through said first relay, said second resistor adapted to respond to a second temperature level of the products of combustion of said burner higher than said first temperature level to permit energizing current to flow through said second relay; a burner starting circuit including said second switch connected between said first and third main's leads; and a burner running circuit including said third switch connected between said first and third main's leads, and interlock means preventing response of said second switch to the influence of said first control relay until after actuation of said second control relay.

8. In a burner control apparatus; first, second, and third mains' leads; a normally closed limit switch connecting said second main's lead with said third main's lead; a first electric control relay having a first normally open switch and a second normally closed switch governed thereby; means connecting said first control relay between said first and second main's leads, including a first thermally responsive resistor and a first variable resistor; a second electric control relay having a third normally open switch governed thereby; means connecting said second control relay between said first and third main's leads including a second thermally responsive resistor, a second variable resistor, and said first switch, said thermally responsive resistors adapted to be thermally associated with the products of combustion of said burner, said first thermally responsive resistor adapted to respond to a first temperature level of the products of combustion of said burner to permit energizing current to flow through said first relay, said second thermally responsive resistor adapted to respond to a second temperature level of the products of combustion of said burner higher than said first temperature level to permit energizing current to flow through said second relay, said first and second variable resistors being adjustable whereby their associated relays may be energized over a range in temperatures of said products of combustion of said burner; a burner starting circuit including said second switch connected between said first and third main's leads; and a burner running circuit including said third switch connected between said first and third main's leads, and interlock means preventing response of said second switch to the influence of said first control relay until after actuation of said second control relay.

PAUL G. FRERER.

REFERENCES CITED

The following references are of record in the file of this patent:

UNITED STATES PATENTS

| Number | Name | Date |
|---|---|---|
| 1,666,331 | Fischer et al. | Apr. 17, 1928 |
| 1,858,265 | Dahlstrom | May 17, 1932 |
| 2,066,413 | Miller | Jan. 5, 1937 |
| 2,129,094 | Lake | Sept. 6, 1938 |
| 2,139,504 | King | Dec. 6, 1938 |

FOREIGN PATENTS

| Number | Country | Date |
|---|---|---|
| 371,002 | Great Britain | Apr. 12, 1932 |